United States Patent Office 2,876,841
Patented Mar. 10, 1959

2,876,841

HYDRAULIC CEMENTS HAVING AN EXTENDED THICKENING TIME, METHODS OF MAKING THE SAME, AND PROCESSES EMPLOYING THE SAME

Martin A. Ryan, Bartlesville, Okla., assignor to Phillips Petroleum Company, a corporation of Delaware No Drawing. Application December 29, 1952
Serial No. 328,456

13 Claims. (Cl. 166—31)

This invention relates to cements having retarded rates of hydration or set, to slurries of such cement, and to the method of making these slurries. The cement with which the invention is concerned is preferably a Portland or Portland-type cement. In another aspect it relates to any hydraulic cement composition in a dry form, or with added water in an aqueous slurry form, which when in the form of an aqueous slurry has a retarded initial set or extended or retarded thickening time and/or a reduced water-loss to adjacent porous formations, due to the addition of a minor but effective amount of an acid carboxyalkyl carbohydrate gum or a salt of the same, in which the alkyl chain is selected from the group consisting of the methylene and ethylene radicals, this invention relating first to said compositions of matter, second to processes of compounding said compositions, and third to processes for using said compositions in the arts of cementing wells, sealing porous formations during the drilling of wells, cementing casings in the well, squeeze cementing, plugging the well or the earth formation adjacent the same, and grouting or sealing crevices, cracks or holes in man-made formations such as buildings, foundations, dams, breakwaters or concrete and masonry structures, in some instances the cracks or fractures already existing before the slurry is pumped into them, and in some cases the pressure of the slurry being pumped into or against the surface of said formation or structure forming by its pressure the cracks or fractures to be filled.

Among the objects of the invention is the provision of a cement having a retarded rate of hydration, or retarded set, as it will hereinafter be termed, particularly at elevated temperatures up to and above 300° F. and/or at high pressures up to and above 20,000 pounds per square inch, such as are encountered in cementing deep wells.

One object of the present invention is to provide a suitable hydraulic cement aqueous slurry, and suitable processes employing the same, for cementing casings in wells, for squeeze cementing in wells, and for grouting cracks, fractures or voids, in natural formations, such as in wells, or in man-made formations such as dams, breakwaters, walls and massive foundations and structures of all types.

Another object of this invention is to provide a dry hydraulic cement powder which is a novel composition of matter, and which may be mixed with water to form an aqueous cement slurry which is a novel composition of matter and which has at least one of the following useful properties: a relatively retarded time of initial set, a relatively extended thickening time during which it is pumpable, and/or a relatively low water-loss to porous formations with which it may come in contact during cementing or grouting operations.

Further objects of the invention reside in the provision of a slurry of the above cement, and in a method of making such slurry.

These and further objects of the invention will be more readily apparent in the following description.

In the cementing of oil wells it is customary to mix a hydraulic cement, for example, a Portland or Portland-type cement, with the requisite amount of water to form a pumpable neat slurry, and to pump the mixture into the well and down the hole into the place where it is desired to have it harden. In present oil well drilling practice, with wells commonly ranging from 6,000 to 12,000 feet or more in depth, high temperatures are encountered at the locations which are to be cemented, and relatively long periods of time are often required to pump the slurry into place. Furthermore, in the customary practice of pumping the cement slurry down through the casing and either forcing it out the bottom of the casing and upward around the outer surface of the casing, or through perforations in the lower end of the casing into the formation sought to be sealed, the slurry is required to pass through narrow channels and small openings. Successful placement of the slurry, therefore, requires that the slurry shall remain fluid and pumpable at high temperatures for several hours before it begins to harden. However, after the slurry has been pumped into place, it is desirable to have the hydration or set proceed at a rate at which the slurry will attain its final set and develop considerable strength within a reasonable time, say within a few days. It would be even more desirable to have it attain its final set in about 24 hours but often this is not attainable.

As pointed out in the preceding paragraph, the most important function of the hydraulic cement aqueous slurry of the present invention is that it has a retarded time of initial set, and therefore remains pumpable for a relatively long period of time and a relatively long period of time passes before it thickens, yet it will attain a final set of some considerable strength within a reasonable length of time so that the well-drilling crew is not unduly delayed, but can get back to work and proceed to continue drilling the well bore, or to perforate the casing and/or cement with the usual gun perforating tools known to the art. All types of acid carboxyalkyl carbohydrate gums in which the alkyl chain is selected from the group consisting of the methylene and ethylene radicals, and any salt of the same, have sufficient set retarding and thickening time extending properties to be used commercially in the practice of the present invention, and when carefully prepared so that a relatively high degree of substitution has occurred with relatively low amounts of degradation of the carbohydrate gum molecules, a secondary effect is achieved, which, while not as important as the first mentioned effect of delaying the time of initial set and extending the thickening time of the cement, is also of considerable value in cementing oil wells, namely, the aqueous cement slurry containing the minor but effective amount of acid carboxyalkyl carbohydrate gum, in which the alkyl chain is selected from the group consisting of the methylene and ethylene radicals, or a salt of the same, has a reduced tendency to lose water to porous formations across the surface of which it must pass in going to its intended position in the well. Many failures in prior art oil well cementing jobs, which have been accredited to the premature setting of the cement, are thought to be caused actually by the formation dehydrating the cement slurry, thereby rendering the cement immobile before it reaches the desired position. As the practice of using scrapers to clean the mud off the well walls to obtain a better cement-formation bond becomes more frequently used, the better the formation will absorb water from the cement slurry causing it not only to plug the annulus between the casing and the wall of the well, but also to have insufficient water for normal hydration upon setting, and the greater will become the realization of the need for low water-loss cements.

Everything which is said applying to natural formations in wells applies also in some degree to man-made formations being grouted, and the word "formation" as used herein is regarded as generic to natural earth formations, geological formations, and man-made formations such as structures.

In the prior art of squeeze cementing in wells and in forcing grout into the cracks and crevices in fractured foundations or the like, it has been the practice to employ as a breakdown agent, water or drilling mud, which is forced ahead of the aqueous hydraulic cement slurry into the formation to split the same and enlarge the fractures or cracks to be filled, because if ordinary hydraulic cement aqueous slurry were employed it would lose water to the formation or foundation so rapidly that the cement slurry would start to set before much penetration has been effected. When a relatively low water-loss hydraulic cement aqueous slurry is employed, the amount of breakdown agent can be greatly reduced, or entirely eliminated, because the low-water loss cement slurry will penetrate to much greater distances before losing sufficient water to be caused to set by this dehydration. When squeeze cementing in oil wells is involved, in which it is desired to force a thin disk or layer of these cement slurries out into a natural earth formation along pre-existing or pressure made fractures, in order to separate an oil sand from some other sand at the general vicinity where the oil well intersects the same, it is especially advantageous to use a relatively low water-loss cement slurry as breakdown agent because then less water is likely to be absorbed by the oil formation where it might cause a reduction in the present or future amount of production of oil. Some oil-bearing formations contain bentonitic materials which swell when they encounter water, and if excess water is injected into such formations, the swelling of the bentonitic material may prevent future production of oil.

It is not believed necessary to have a drawing, or to describe minutely the well known cementing operations disclosed in such patents as U. S. 2,795,507 and 2,795,508.

By hydraulic cement this invention intends to include all mixtures of lime, silica, and alumina, or of lime and magnesia, silica and alumina and iron oxide (magnesia for example may replace part of the lime, and iron oxide a part of the alumina), as are commonly known as hydraulic cements. Hydraulic cements include hydraulic limes, grappier cements, puzzolan cements, natural cements, and Portland cement. Puzzolan cements include slag cements made from slaked limes and granulated blast furnace slag. Because of its superior strength Portland cement is preferred among the hydraulic cements, but as the art of cements recognizes hydraulic cements as a definite class, and as results of value may be obtained with acid carboxyalkyl carbohydrate gums, in which the alkyl chain is selected from the group consisting of the methylene and ethylene radicals, or a salt of the same, with any member of that class, it is desired to claim all hydraulic cements. In addition to the ordinary construction grades of Portland cement or other hydraulic cements, modified hydraulic cements and Portland cements designated as high-early-strength, heat-resistant cement, and slow-setting cement may be used in the present invention.

In most oil well cementing and grouting operations it is generally desirable to use neat cement for added strength, but obviously it is always possible to add to the hydraulic cement, water and acid carboxyalkyl carbohydrate gum or a salt of the same, any desired amount of an inert granular filling material aggregate such as sand, ground limestone, or any of the other well known inert or even cementitious aggregates, as long as simple tests show the amount added does not reduce the compressive strength after final set below the desired value. For example, in plugging porous formations, bentonite or other clays are often added to hydraulic cement aqueous slurries, as taught by U. S. Patent 2,041,086 of May 19, 1936, or iron oxide or barium sulfate is added to make heavy cement. Any of these aggregates can be added to the aqueous hydraulic cement slurry of the present invention in the usual proportions used in the prior art.

In operations in previously uncased wells it is often desirable to use neat cement in the practice of the present invention, because inert filling material may automatically become detached from the walls of the well, and will tend to mix with and dilute the slurry to such an extent that it is undesirable to add any filling material to the slurry being forced into the well. It is customary in the prior art when cementing to make simple tests as to the time of set, compressive strength, etc., on sample of the proposed mix.

The amount of water added to the cement of the present invention is not critical, it being obvious that sufficient water should be added to form a pumpable slurry, and that when the slurry becomes pumpable no further water need be added. One advantage of the slurry of the present invention when a relatively less degenerated acid carboxyalkyl carbohydrate gum in which the alkyl chain is selected from the group consisting of the methylene and ethylene radicals, or a salt of the same, is used, is that it is a low water-loss slurry, and therefore it is not necessary to add much excess water over the amount making the slurry pumpable as a reserve for expected losses, which excess water might tend to reduce the final compressive strength of the cement.

It has been found that all hydraulic cements, especially Portland and Portland-type cement aqueous slurries can be retarded in setting time, the time of thickening extended, and in some cases the water-loss tendencies retarded, so that they meet all the above requirements for the satisfactory cementing of deep wells and like operations by the addition of a minor but effective amount of from about 0.3 to 6 percent by weight of the dry hydraulic cement of acid carboxyalkyl carbohydrate gum in which the alkyl chain is selected from the group consisting of the methylene and ethylene radicals, or the metal, ammonium or organic base, or other salts of said acid carboxyalkyl carbohydrate gum in which the alkyl chain is selected from the group consisting of the methylene and ethylene radicals, without seriously affecting the other desirable properties of the cement. It is preferred at present to use the sodium or potassium salts of acid carboxyalkyl carbohydrate gum in which the alkyl chain is selected from the group consisting of the methylene and ethylene radicals because these salts are readily available commercially and therefore relatively inexpensive. However, good results will be obtained using any other alkali metal salt, such as the lithium, rubidium, cesium and other rare alkali metal salts, or the ammonium or organic base salts of acid carboxyalkyl carbohydrate gum in which the alkyl chain is selected from the group consisting of the methylene and ethylene radicals, all of which are water-soluble. Typical organic base salts that cn be used are those derived from ammonia such as methyl amine, dimethyl amine and quaternary ammonium bases; also pyridine, morpholine and the like. In addition the alkaline earth metal salts such as the barium, calcium, strontium and magnesium and the heavy metal salts such as the aluminum, copper, iron, lead, silver, mercury, nickel, and all other salts of acid carboxyalkyl carbohydrate gum in which the alkyl chain is selected from the group consisting of the methylene and ethylene radicals (which are probably insoluble in water but which hydrolyze in the hydraulic cement aqueous alkaline solution) are just as useful in the invention in the aqueous hydraulic cement slurry which is quite alkaline. Acid carboxyalkyl carbohydrate gum in which the alkyl chain is selected from the group consisting of the methylene and ethylene radicals and all of its salts, whether such salt is formed in the aqueous hydraulic cement slurry by hydrolysis of some water-insoluble salts, are all valuable in amounts of 6 percent or less, based on weight of dry cement, in retarding the set of aqueous hydraulic cement slurry, especially at the temperature and pressure encountered in cementing a well, and in many instances the acid carboxyalkyl carbohydrate gum in which the alkyl chain is selected from the group consisting of the methylene and ethylene radicals, or salt, will decrease the water-loss from said aqueous hydraulic cement slurry to porous formations encountered in the well.

While 0.3 to 6 percent of acid carboxyalkyl carbohydrate gum in which the alkyl chain is selected from the group consisting of the methylene and ethylene radicals or its salts by weight of the dry hydraulic cement will give valuable results, it has been found that from 0.3 to 3 percent is the most preferred range in wells less than 14,000 feet deep and less than 300° F., the use of 0.5 percent being particularly effective in such wells, and the percentage above 3 percent being chiefly of value in still deeper and hotter wells.

The term acid carboxyalkyl carbohydrate gum in which the alkyl chain is selected from the group consisting of the methylene and ethylene radicals and its salts covers all such ethers however produced.

Examples of carbohydrate gums suitable for making acid carboxyalkyl carbohydrate gum ethers and salts of the same which are useful in the cement slurries of the present invention for the purposes of the present invention are as follows:

Carbohydrate gums such as gum arabic, tara gum, gum tragacanth, gum karaya, locust bean gum, are useful.

Carboxyalkyl ethers, and especially alkali metal salts of the carboxyalkyl ethers of these gums are readily dispersible and form sols of excellent clarity, as compared to untreated gum. The invention is applicable to carbohydrate gums in general but is particularly applicable to the galactomannan and the glucomannan gums. These gums are polysaccharides composed principally of galactose and mannose units, and glucose and mannose units respectively. The galactomannans are usually found in the endosperm of leguminous seeds, such as guar, locust bean, honey locust, flame tree, *Cassia occidentalis*, and the like. The glucomannans, on the other hand are usually found in the corms of plants of the araceae family, such as *Amorphophallus oncophyllus*, from which the product known as iles mannan is obtained, and *Amorphophallus rivieri* from which konnyaku flour is obtained. The carboxyalkyl ethers of the galactomannan gums and glucomannan gums in general produce sols having viscosities comparable to that of sols of the untreated gums. In some instances the viscosity of the treated gum may be increased somewhat. It has been noted, moreover, that the carboxyalkyl ethers of the galactomannan and glucomannan gums form gels on addition of a dilute solution of metal salts such as ferrous sulfate, aluminum sulfate, aluminum chloride, and the like. These gels are very firm and can be transferred from one container to another without wetting the surface.

The other carbohydrate gums such as tragacanth, arabic, karaya and the like, form carboxyalkyl ethers which produce aqueous sols of decidedly reduced viscosity as compared with the original gum.

All the above mentioned carbohydrate gums and all the members of the class of carbohydrate gums may be made into acid carboxyalkyl carbohydrate gum, or salts of the same, having suitable properties of increasing the setting, or thickening, time or decreasing the water loss of aqueous hydraulic cement slurries as taught in the present invention.

Some of the same sodium carboxymethyl gum arabic ether described in Example 6 of Moe, 2,520,161, of August 29, 1950, was used in the example of the present application, and may be prepared for the present use in the same manner.

One suitable method for producing carboxymethyl carbohydrate gum is by the action of chloroacetic acid on a carbohydrate gum which has not been degraded or in which the amount of degradation is negligible. The two carboxyethyl carbohydrate gums may be prepared by the reaction of acrylonitrile on the carbohydrate gum followed by hydrolysis. See also Example 7 of Moe, 2,520,161, of August 29, 1950.

The acrylonitrile process for the making of carboxyethylcellulose compounds is fully described in U. S. Patents No. 2,332,048 (1943) and No. 2,349,797 (1944) and can be used to make carboxyethyl carbohydrate gums for use in the present invention.

However, any method may be used in the preparation of these carboxyalkyl carbohydrate gums as long as there is not excessive degradation. The method of preparation is not a part of this invention.

The various salts may be made by treating the free acid with a soluble salt of the preferred metal ion, or by any other suitable reaction.

A sample of the sodium salt of carboxymethyl gum arabic ether used in these tests was prepared in the following way. 55 grams of gum arabic was dissolved in a caustic solution of 13.3 parts of sodium hydroxide in 200 parts of distilled water. To this mixture was added a solution of 31.5 parts of chloroacetic acid in 50 parts of water neutralized with 13.3 parts sodium hydroxide and 20 parts of water, added slowly with stirring to the cool basic gum arabic and heated to 80° C. for 70 minutes. The reaction mixture was allowed to stand at room temperature for 24 hours.

The sodium carboxymethyl gum arabic ether was precipitated by pouring the solution into methyl alcohol. The precipitate was filtered and washed with acetone. The precipitate was then dissolved, precipitated with methyl alcohol and washed with acetone. This procedure was repeated three more times and finally the precipitate was washed several times with absolute ethyl alcohol and dried in an oven at 110° F. The sodium carboxymethyl gum arabic ether was a colorless solid readily soluble in water.

The acid carboxyalkyl carbohydrate gum in which the alkyl chain is selected from the group consisting of the methylene and ethylene radicals can be liberated from an aqueous solution of the sodium salt by addition of hydrochloric acid. The various metal salts of carboxyalkyl carbohydrate gums may be prepared by the addition of a salt of the desired metal to an aqueous solution of the free acid followed by precipitation by the addition of alcohol, acetone or a similar non-polar solvent.

Valuable results are also obtained with the water-soluble metal and ammonium or organic base salts of carboxyalkyl carbohydrate gums in which the alkyl chain is selected from the group consisting of the methylene and ethylene radicals, especially the alkali or alkaline earth metal salts. The preferred alkaline earth metals are calcium, barium, strontium and magnesium, but other metal salts may be used which hydrolyze in alkaline solutions. Such other metal salts include aluminum, iron, copper, lead, silver, mercury, nickel, zinc and other heavy metals.

Portland cement is a mixture of complex silicates and aluminates of calcium containing excess lime. The setting or hardening is a result of the hydration or other chemical readjustments of the various components. Generally speaking, three periods in the set are recognized: "initial," "final" and "hardening" sets. The initial set normally occurs at ordinary temperatures in from one to two hours after the mixing, the final set two to five hours later and the hardening continues for an indefinite time but it is substantially complete in about 30 days.

The initial set is said to have occurred when a cement slurry has lost its plasticity to such a degree that the two pieces of a broken specimen will not unite to form a homogeneous mass when placed in close contact. The individual grains of a cement slurry must remain undisturbed in intimate contact with each other for a time before the initial set occurs in order to produce a coherent mass. Agitation during the latter part of the period of initial set will prevent the cement from hardening properly to the desired homogeneous, coherent mass.

In order to form a perfect seal in cementing wells, it is necessary that the cement be placed before the initial set occurs and it is desirable that it be placed and allowed to stand for a short period before the initial set begins. With the equipment available, there is a limit to the time in which it is possible to mix a cement and pump it into the bottom of the well and up around the casing to the location desired.

Another reason it is necessary to have the cement in place before the initial set begins is that the viscosity rises as the setting progresses. This increases the difficulty of pumping and is undesirable because of the added strain on the pumping equipment.

It is possible to retard the rate of set, within narrow limits, by increasing the alumina content of the cement, but this method is not widely used because of the high cost of high alumina cements and the limited effective range. The rate of set can be retarded also by increasing the amount of water present in the mix. However, above about 35 to 50 percent water, based on the weight of dry cement, increased amounts of water will result in weaker cement and there is no way of knowing exactly how much dilution will result from water encountered in the well. Addition of small amounts of gypsum or calcium sulfate will result in a retarded rate of set, but an excess will increase the rate and may cause the cement to disintegrate or be weakened. It is therefore highly desirable that a retarded cement such as mine be available for cementing work. The most convenient method of using acid carboxyalkyl carbohydrate gums in which the alkyl chain is selected from the group consisting of the methylene or ethylene radicals or a salt of the same in cement is to run the same and the hydraulic cement through a rotary mixer to produce intimate mixing and later add water to form a fluid slurry. However, this gum derivative may be added directly to the cement and water at the time of mixing at the well, or may be dissolved in the water with which the cement is mixed, with substantially the same result. The method of mixing is not critical as long as a somewhat uniform mixture is produced.

The rate of hydration or set of cement is ordinarily increased by an increase of temperature. Since the bottom hole temperature in the well may be considerably higher than the atmospheric temperature, it is desirable that a method such as I have described be available for use in cementing of oil wells. My method is effective at elevated temperatures as well as at ordinary atmospheric temperatures, because obviously a set retarding agent operative at atmospheric temperatures will also retard the set at higher temperatures.

While it is not desired to limit the present invention by any theory of operation and while the scope and validity of the claims do not depend upon the validity of any theory of operation, it is believed helpful in understanding the invention to think of the acid carboxyalkyl carbohydrate gum in which the alkyl chain is selected from the group consisting of the methylnene and ethylene radicals or a salt of the same, as temporarily absorbing so much of the water that the Portland cement is only slowly able to obtain enough water to make its initial set, whereby the initial set of the cement is greatly retarded. Finally the Portland cement particles take the water away from the water-soluble cellulose particles and attain an initial and then a final set with suitable strength in the cement for use in oil well cementing operations. Said gum derivatives have a jelling effect on the cement slurry, which is believed to tend to reduce their loss of water to porous formations which they contact.

EXAMPLE A

A neat Portland cement aqueous slurry having a density of 15 pounds per gallon was tested without any additive, and with 0.50 percent and 2 percent respectively of the weight of the dry cement of sodium carboxymethyl gum arabic (abbreviated NaCMGA in Table I below). The dry cement, NaCMGA and water were blended for 35 seconds in a Waring Blendor.

*Table 1*

| Additive | Percent added | Halliburton thickening time at 180° F. (hrs: mins) | Water loss (ml./min.) | | |
|---|---|---|---|---|---|
| | | | Initial | 0.5 hr. at 180° F. | 1.0 hr. at 180° F. |
| Control | 0.0 | 1:43 | 30/0.2 | | |
| NaCMGA | 0.5 | 4:00 | 36/2.6 | 38/0.1 | |
| NaCMGA | 2.0 | (¹) | 5/30 | | 25/0.9 |

¹ In three attempts to run this test the cement set on the paddle and continued to rotate freely inside the cup.

The carboxymethyl gum arabic reduced the water loss and retarded the thickening of the Portland cement slurries.

While examples of the invention have been given for purposes of illustration, the invention is not limited thereto.

Having described my invention, I claim:

1. A hydraulic cement aqueous slurry comprising a major amount of a hydraulic cement, sufficient water to form a pumpable slurry, and a minor but effective amount, sufficient to reduce the water loss from said slurry to a pervious formation, but insufficient to retard the time of intial set to 24 hours, of 0.3 to 6 percent by weight of the dry hydraulic cement of a hydraulic cement water loss reducing agent selected from the group consisting of acid carboxymethyl carbohydrate gum, acid carboxyethyl carbohydrate gum, and salts of said acids.

2. A hydraulic cement aqueous slurry comprising a major amount of a hydraulic cement, sufficient water to form a pumpable slurry, and a minor but effective amount, sufficient to reduce the water loss from said slurry to a pervious formation, but insufficient to retard the time of initial set to 24 hours, of a hydraulic cement water loss reducing agent selected from the group consisting of acid carboxymethyl carbohydrate gum, acid carboxyethyl carbohydrate gum, and salts of said acids.

3. A hydraulic cement aqueous slurry comprising a major amount of a hydraulic cement, sufficient water to form a pumpable slurry, and a minor but effective amount, sufficient to reduce the water loss from said slurry to a pervious formation, but insufficient to retard the time of initial set to 24 hours, of 0.3 to 6 percent by weight of the dry hydraulic cement of acid carboxymethyl gum arabic, and salts of said acid.

4. A hydraulic cement aqueous slurry comprising a major amount of a hydraulic cement, sufficient water to form a pumpable slurry, and a minor but effective amount, sufficient to reduce the water loss from said slurry to a pervious formation, but insufficient to retard the time of initial set to 24 hours, of acid carboxymethyl gum arabic, and salts of said acid.

5. A hydraulic cement aqueous slurry comprising a major amount of Portland cement, sufficient water to form a pumpable slurry, and from 0.5 to 3 percent by weight of the dry hydraulic cement of sodium carboxymethyl gum arabic.

6. A cement capable of forming a fluid slurry when mixed with water comprising a major amount of a hydraulic cement, and a minor but effective amount, sufficient to reduce the water loss from said slurry to a pervious formation, but insufficient to retard the time of initial set to 24 hours, of 0.3 to 6 percent by weight of the dry hydraulic cement of a hydraulic cement water loss reducing agent selected from the group consisting of acid carboxymethyl carbohydrate gum, acid carboxyethyl carbohydrate gum, and salts of said acids.

7. A cement capable of forming a fluid slurry when mixed with water comprising a major amount of a hydraulic cement, and a minor but effective amount, sufficient to reduce the water loss from said slurry to a pervious formation, but insufficient to retard the time of initial set to 24 hours, of a hydraulic cement water loss reducing agent selected from the group consisting of acid carboxymethyl carbohydrate gum, acid carboxyethyl carbohydrate gum, and salts of said acids.

8. A cement capable of forming a fluid slurry when mixed with water comprising a major amount of a hydraulic cement, and a minor but effective amount, sufficient to reduce the water loss from said slurry to a pervious formation, but insufficient to retard the time of initial set to 24 hours, of 0.3 to 6 percent by weight of the dry hydraulic cement of acid carboxymethyl gum arabic, and salts of said acid.

9. A cement capable of forming a fluid slurry when mixed with water comprising a major amount of a hydraulic cement, and a minor but effective amount, sufficient to reduce the water loss from said slurry to a pervious formation, but insufficient to retard the time of initial set to 24 hours, of acid carboxymethyl gum arabic and salts of said acid.

10. A hydraulic cement comprising a major amount of Portland cement, and from 0.5 to 3 percent by weight of the dry hydraulic cement of sodium carboxymethyl gum arabic.

11. The process of cementing a well which extends into a porous formation which comprises circulating the hydraulic cement aqueous slurry of claim 1 into said well into contact with said formation and maintaining the same in said well until said cement sets.

12. The process of cementing a well which extends into a porous formation which comprises circulating the hydraulic cement aqueous slurry of claim 4 into said well into contact with said formation and maintaining the same in said well until said cement sets.

13. The process of cementing a well which extends into a porous formation which comprises circulating the hydraulic cement aqueous slurry of claim 5 into said well into contact with said formation and maintaining the same in said well until said cement sets.

References Cited in the file of this patent

UNITED STATES PATENTS

| | | |
|---|---|---|
| 2,427,683 | Ludwig | Sept. 23, 1947 |
| 2,489,793 | Ludwig | Nov. 29, 1949 |
| 2,562,148 | Lea | July 24, 1951 |
| 2,576,955 | Ludwig | Dec. 4, 1951 |
| 2,620,279 | Clark | Dec. 2, 1952 |